US005211278A

United States Patent [19]
Mendenhall

[11] Patent Number: 5,211,278
[45] Date of Patent: * May 18, 1993

[54] FOOD TRANSPORT CHAIN CONVEYOR SYSTEM

[75] Inventor: George A. Mendenhall, Boise, Id.

[73] Assignee: Lamb-Weston, Inc., Tri-Cities, Wash.

[ * ] Notice: The portion of the term of this patent subsequent to Jun. 23, 2007 has been disclaimed.

[21] Appl. No.: 874,123

[22] Filed: Apr. 24, 1992

Related U.S. Application Data

[63] Continuation-in-part of Ser. No. 648,053, Jan. 30, 1991, Pat. No. 5,123,521, which is a continuation-in-part of Ser. No. 472,714, Jan. 31, 1990, Pat. No. 5,010,796.

[51] Int. Cl.[5] ............ B65G 15/14
[52] U.S. Cl. ............ 198/626.4; 198/626.6
[58] Field of Search ............ 198/626.1, 626.4, 626.5, 198/626.6, 604, 605, 606, 607, 817

[56] References Cited

U.S. PATENT DOCUMENTS

| | | | |
|---|---|---|---|
| 2,826,229 | 3/1958 | Necula | 146/78 |
| 2,849,102 | 8/1958 | Borrowdale | 198/605 |
| 3,057,386 | 10/1962 | Massaro | 146/78 |
| 3,952,621 | 4/1976 | Chambos | 83/733 |
| 3,952,861 | 4/1976 | Holmqvist et al. | 198/816 |
| 4,082,024 | 4/1978 | Hodges et al. | 83/402 |
| 4,135,002 | 1/1979 | Hodges et al. | 426/482 |
| 4,146,124 | 3/1979 | Krooss | 198/456 |
| 4,228,963 | 10/1980 | Yamauchi et al. | 193/44 |
| 4,316,411 | 2/1982 | Keaton | 198/626.6 |
| 4,566,585 | 1/1986 | Dreher et al. | 198/624 |
| 4,644,838 | 2/1987 | Sampson et al. | 83/865 |
| 4,807,503 | 2/1989 | Mendenhall | 83/22 |
| 4,926,726 | 5/1990 | Julian | 83/165 |
| 4,979,418 | 12/1990 | Covert et al. | 83/865 |
| 5,010,796 | 4/1991 | Mendenhall | 83/865 |
| 5,094,340 | 3/1992 | Avakov | 198/626.1 |
| 5,123,521 | 6/1992 | Mendenhall | 198/626.4 |

*Primary Examiner*—Robert P. Olszewski
*Assistant Examiner*—Cheryl L. Gastineau
*Attorney, Agent, or Firm*—Klarquist, Sparkman, Campbell, Leigh & Whinston

[57] ABSTRACT

A conveyor chain transport system for delivering fruits or vegetables to a longitudinal passageway (22) defined by two sets of opposing endless loop conveyor chains (24). A plurality of tensioner assemblies (30), which have two opposing pairs of independently acting chain sprocket assemblies (70 and 100), are provided to independently tension each set of conveyor chains (24) along both an x and a y axis so that each individual food product, regardless of shape and size, is subjected to uniform chain tension. Each pair of opposing chain sprocket assemblies are interconnected to a single cam ring (34 and 52), such that displacement of one chain sprocket by food product results in reciprocal and equal displacement of the other opposing chain sprocket, thus facilitating centering of the food product as it is delivered to cutter blade assembly (200).

15 Claims, 8 Drawing Sheets

FOOD TRANSPORT CHAIN CONVEYOR SYSTEM

PRIORITY

This is a continuation-in-part of copending application entitled Food Transport Belt System filed Jan. 30, 1991 as application Ser. No. 07/648,053, U.S. Pat. No. 5,123,521 which itself is a continuation-in-part of U.S. patent application Ser. No. 07/427,714, filed Jan. 31, 1990, now issued as U.S. Pat. No. 5,010,796 dated Apr. 30, 1991

BACKGROUND OF THE INVENTION

1. Technical Field

This invention generally relates to a multiple chain conveyor system for conveying food product into a food cutter blade assembly. More particularly, it relates to a four conveyor chain system which forms a moving channel through which food product is conveyed.

2. Background Art

A significant percentage of the fresh fruits and vegetables grown in the world today are commercially processed and packaged prior to distribution to the general public. Processing typically includes peeling, cutting, preserving, either by cooking, canning, or freezing, and packaging in convenient and appropriate portion sizes. This invention relates to a means of delivering the fruit or vegetable to be cut to the cutting device.

There are two general categories of cutting devices in current use today. If the cutting process is amenable to the use of a stationary set of cutting blades, then the preferred method is to use a hydraulic cutting system wherein the food products to be cut are suspended in water and pumped at high speed through some sort of an alignment device and then into the path of a fixed cutting blade array. When the food product impinges the fixed array of cutting blades, it is cut into the desired shapes. After which, the cut food pieces are separated from the water and transported for further processing. An example of such a hydraulic cutting machine can be found in my U.S. Pat. No. 4,807,503. These types of machines generally have very high capacities and also the benefit of few moving parts, thus relatively low maintenance requirements.

However, there are some types of food cuts which cannot be accomplished by use of a fixed cutting or stationary cutting blade. A good example of this is the helical coil, or curly cut, french fry as shown in SAMPSON, U.S. Pat. No. 4,644,838, and the helical split ring french fry as shown in my U.S. Pat. No. 5,010,796. Both of these cuts require the use of a rotating cutter blade assembly, and as such, are not readily adaptable for use with a hydraulic cutting machine. As a result there is a second general classification of food cutting machines. This is the mechanical machine wherein the food product to be cut is not suspended in a carrier medium, but rather is mechanically forced through the cutting device. The present invention is directed to a transport system for conveying food product into a mechanical cutting device as opposed to a hydraulic cutting device.

For purposes of this specification, the potato will be used as a representative food product, however it should be clearly understood that the problems discussed in this prior art section of the specification, and the solutions described in the remainder of the specification and in the claims, are equally applicable to other food products including, but certainly not limited to, beets, cucumbers, carrots, onions, pineapples, apples, pears, and the like.

As anyone who has ever taken a sharp knife to a fresh potato knows, it takes a considerable amount of force to cut an uncooked potato into small pieces. The conventional solution has been to use some sort of a plunger apparatus to firmly hold the potato fixed relative to the rotating cutter blade, and to push it into the rotating cutter blade. An example of this conventional wisdom is found in SAMPSON, ET AL., U.S. Pat. No. 4,644,838, which discloses a machine which has a feed mechanism having a plurality of holding cylinders into which potatoes are individually loaded and a plunger device for pushing the held potatoes through a rotating cutter. Machines such as those disclosed in SAMPSON, ET AL. are complicated, have a large number of moving parts, are expensive to purchase, and difficult to maintain. The other, and perhaps even more significant problem is that the machines as disclosed by SAMPSON, ET AL. have, by their very design, a fixed reload time and as a result, a limited capacity.

Another problem with cutting fresh fruits and vegetables is that they are not generally of uniform size and shape. This can be particularly true with potatoes. Potatoes, and particularly the Russet Burbank variety of potatoes, which is the most common and preferred variety of potato used for production of frozen french fries, can vary in size and shape over a substantial range. In addition, not only can the size of the potato vary, so can the shape of its cross-sectional area. Russet Burbank potatoes can be perfectly cross-sectionally round, oblong, or even have one flat side. Lengthwise, the shape can be round, elliptical, or even a triangular shaped ellipsoid.

Yet, in any rotary cutting blade system, regardless of the size and shape of the potato to be cut, it is very important that the potato be centered over the axis of rotating of the cutter blade in order to minimize the amount of scrap or unusable cut pieces that will be generated in the cutting process. For example, if the desired cut design is a helical spiral where each piece is approximately 6 mm. in cross-sectional width and length, if the potato, when impinging upon the cutter blade assembly, is offset by just a mere 4 mm., the two outer helical coils cut from the potato will be scrap. If the potato being cut has an average cross-sectional diameter of 5 cm. and the outer two helicals of 6 mm. each are scrap, that will result in 24% of the potato being cut into scrap or unusable pieces. Also, it should be apparent that separating these scrap pieces from the high quality helical spirals is difficult and time consuming.

Accordingly, it is an important object of this invention to not only deliver the potatoes to the rotating cutter assembly with sufficient force to pull them through the cutter assembly, but also to center them directly coincident to the axis of rotation of the rotating cutter blade.

What is needed is a conveyor channel which will firmly grip and pull an endless stream of properly centered food products, such as potatoes into a rotating cutter blade assembly. In order to accomplish this object, it is necessary that the conveyor assembly hold the food product with sufficient force to enable it to continually pull the food product into the rotating cutter blade assembly. In addition, the conveyor assembly must be able to hold the food product with a uniform force regardless of nonuniform size and shape of the various food products.

DISCLOSURE OF INVENTION

These objects are accomplished by use of a conveyor chain assembly which utilizes a plurality of stacked tensioner assemblies which are configured to hold two sets of opposing endless loop conveyor chains, at right angles to each other, to form a transport channel which is slightly smaller than the size of the potatoes to be conveyed to the cutter assembly. The food transport channel is formed of four endless loop conveyor chains which begin their loop at the top of the assembly, from where they travel down in a parallel spaced, four-sided configuration, to form the transport channel. The chains then continue on, in the configuration of the transport channel, down through a series of tensioner assemblies to the top of the rotating cutter head assembly, then out around drive gears, back up through primary tensioning assemblies, and back to and over the top of the assembly.

It is useful to define a three dimensional set of coordinate axis in analyzing the function of the tensioner assemblies, with the central axis of the longitudinal food passageway being defined as the z axis, and a planar coordinate axis normal to the z axis, and defined by an x axis transversely crossing between a first pair of opposing chains, and a y axis transversely crossing between the second pair of opposing chains. Each tensioner assembly has two pairs of opposing chain sprocket assemblies which, when unloaded, hold in alignment the conveyor chains forming the sides of the longitudinal passageway. Each tensioner assembly has as its basic frame member, a baseplate, above which are held, in spaced relationship, two rotatable cam rings, one of which functions to allow tensionally controlled release of two opposing chain sprockets outward along the x axis and the remaining two chain sprocket assemblies outwardly along the y axis so as to accomplish two functions, the first to maintain a minimum setpoint tension on each individual potato, regardless of its size and shape, and secondly to center each individual potato along the centerline of the food passageway, or z axis, as they pass down through the passageway formed of the conveyor chains.

Each pair of opposing sprocket chain assemblies have a central, slidable, shaft, to which at one end is attached a chain sprocket yoke and chain sprocket, and at the other end a cam roller yoke, and a cam roller. Each cam roller interfits into an arcuate slideway which is formed integral with, and spirals out from, the center of a cam ring. When a potato passing down through the food passageway encounters a chain sprocket, it will laterally displace the chain sprocket out along its axis, either x or y. The chain sprocket, which is held in a slide block attached to the base plate of tensioner assembly, is laterally displaced out, with the cam roller traveling within the arcuate cam slideway within the cam ring. This in turn rotates the cam ring in relation to the fixed base plate thereby imparting an equal, reciprocal, outward displacement to the sprocket assembly opposite the one impacted by the traveling potato, thus providing a centering action by the cam ring to center the potato along that particular axis.

The longitudinal food passageway is sized to be slightly smaller than the minimum food product size of the food product to be cut, thus insuring that each food product piece passing down through the longitudinal food passageway displaces the chain sprockets of the tensioner assemblies thereby insuring that each food product piece is centered, regardless of its size and shape, at the time that it is pulled into the rotating cutter head assembly.

Tensioning of the conveyor chains is accomplished through the use of three separate systems the first is the primary tensioning of the chains by a constant tension assembly which is spring loaded to hold each chain in uniform and constant tension. The chain sprocket assemblies are themselves tensioned by means of tensioning springs connected between the slide blocks which are fixed to the base plate, and the slidable chain sprocket assembly shafts which hold the chain sprockets. When the chain sprocket assemblies are unloaded, they are biased by these springs in an inwardly extended position to maintain the minimum size for the longitudinal food passageway, and provide a predetermined and selectable tensional bias against outward displacement. Additional tensional bias against outward displacement of the chain sprockets is provided by a secondary set of tensioning springs which can be utilized to bias the cam rings against rotation induced by displacement of the sprocket assemblies and the interconnecting cam rollers.

In order for the conveyor chain system to work, it is essential that each endless loop of conveyor chains be driven at precisely the same speed. Provided is a synchronized drive gear system which has four drive gears, one for each of the conveyor chain loops, each interlocked one to the other by means of drive shafts and right angled beveled gear assemblies. Motive power is provided by a conventional electric motor, preferably powered by a variable frequency converter there as to provide an adjustable speed feature.

BEST MODE FOR CARRYING OUT INVENTION

As previously set forth in the prior art section of this specification, the potato is used as an example of food product to be cut and as such this Best Mode description sets forth tensioning parameters for holding a potato as it is pulled into a rotating cutter blade assembly. Also as previously set forth, this transport system will work equally well with a large variety of other fruits and vegetables of varying hardness, texture and cellular structures. Depending upon the particular fruit or vegetable to be cut, its texture, its hardness, and even the physical characteristics of its protective skin or outer shell, adjustments to the tensional forces and chain lug characteristics will be required. These factors are typically determined empirically and as can be seen from the following description of the preferred embodiment, tension is easily adjusted by varying tensional strengths of adjustment springs. Additionally, the configuration described in this Best Mode section of that specification is configured for use for practicing the Invention as set forth in my U.S. Pat. No. 5,010,796, issued Apr. 30, 1991, for the production of helical, split ring, potato pieces for further processing into helical split ring french fries, the teachings of which are incorporated herein by reference.

Figure 1:
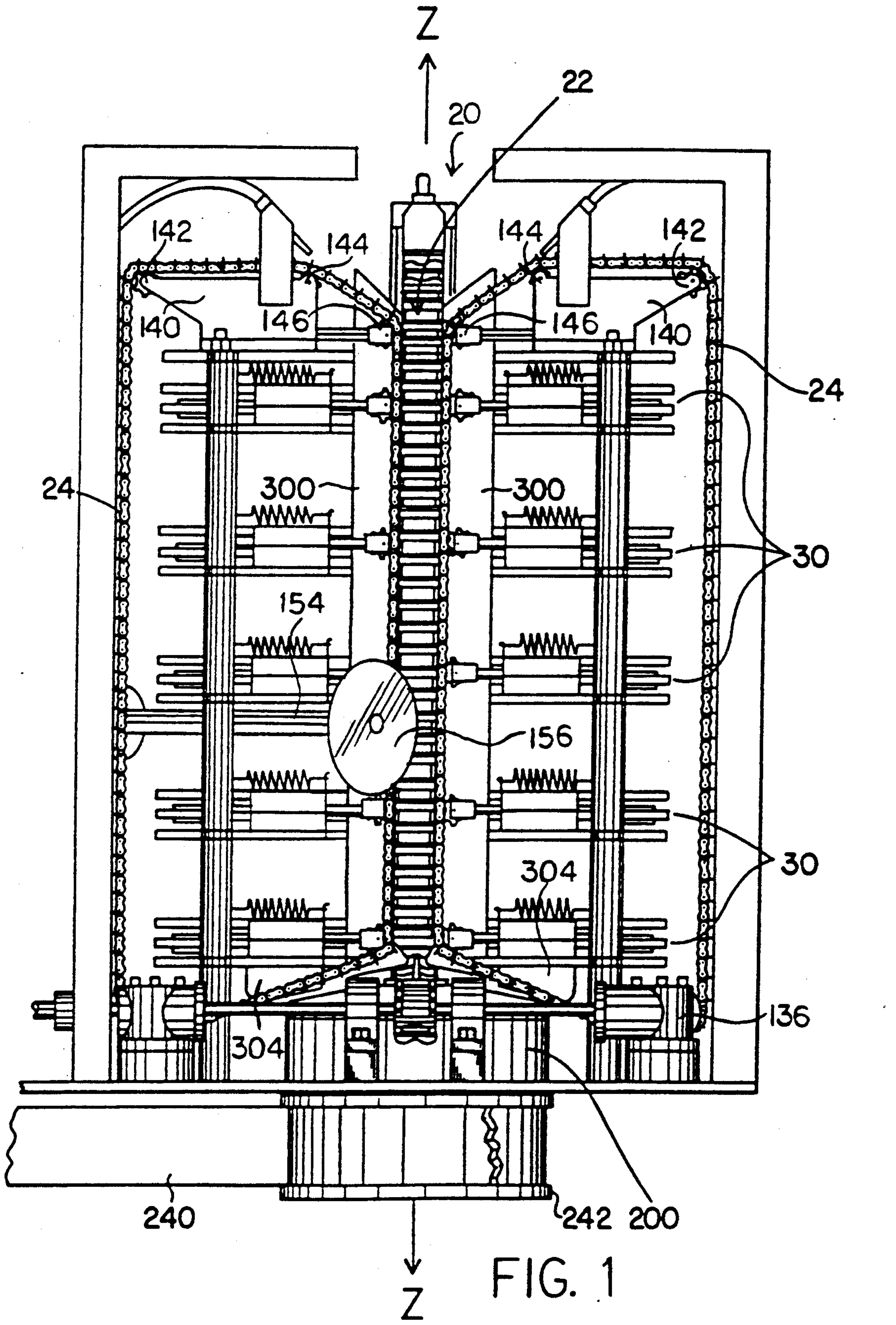
FIG. 1 is a sectional side view of the conveyor assembly.
Figure 2:
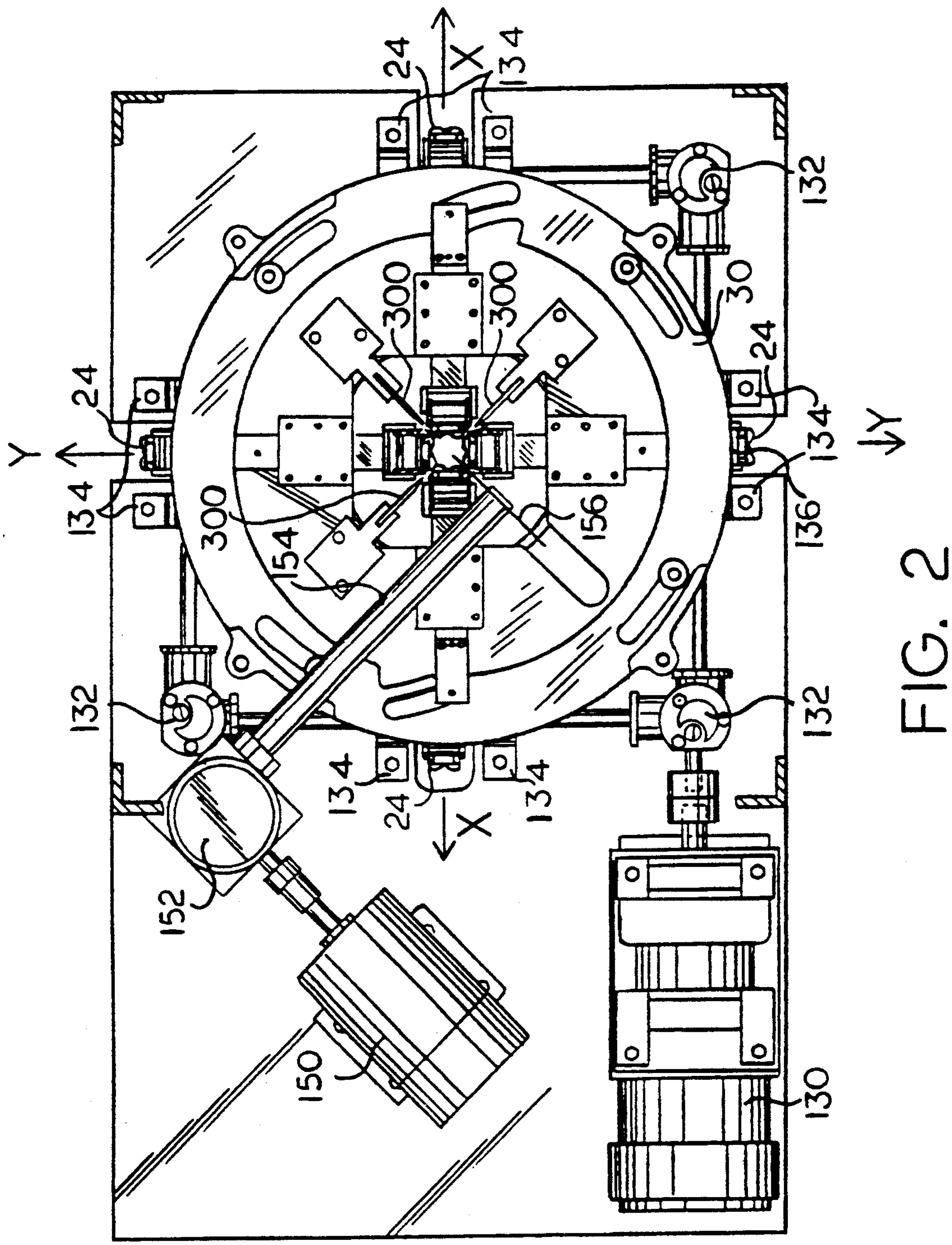
FIG. 2 is a sectional top view of the conveyor chain assembly.

Referring to FIGS. 1 and 2, it can be seen that there are four endless conveyor chains 24 configured to form transport channel 22 for passing whole potatoes from drop point 20 down into a rotating cutter blade generally described as 200 and shown in detail in my U.S. Pat. No. 5,010,796. There are a variety of well known devices for delivering the food product to the drop point, none of which play a part in the present invention. Rotating cutter blade assembly 200 is driven by a cutter drive motor, not shown, through cutter drive pulley 242 and cutter drive chain 240. As shown in my prior U.S. Pat. No. 5,010,796, in order to produce helical split ring french fries it is first necessary to cut a slot in the potatoes prior to driving them into cutter blade assembly 200. As shown in FIGS. 1 and 2 this is accomplished by means of rotating slotting blade 156 which is positioned to extend into food channel 22. Rotating slotting blade 156 can be powered and driven in a conventional manner by means of slotting knife drive motor 150 transferring power through right-angle bevel gear assembly 152 to slotting blade shaft 154, or can be freewheeling and unpowered.

When using a rotating cutting blade assembly 200 to produce some sort of a circular cut, for example helical coils or helical split rings, it is of importance that the potato or other fruit or vegetable be centered as exactly as is possible, given the irregular fruit or vegetable shape, over the axis of rotation of the cutting assembly. Failure to center the food product to be cut, even by as little as a few millimeters off center, will result in a substantial increase in waste or scrap pieces. For example, if cutting helical spirals of potatoes for processing into curly fries, if the potato pieces to be cut are 6 mm. in thickness, a misalignment of 4 mm. will result in the outer cuts of helical spirals being considered scrap and therefore unusable. Additionally, it should be apparent that separating these unusable scrap pieces would be a difficult and time consuming job.

Figure 3:
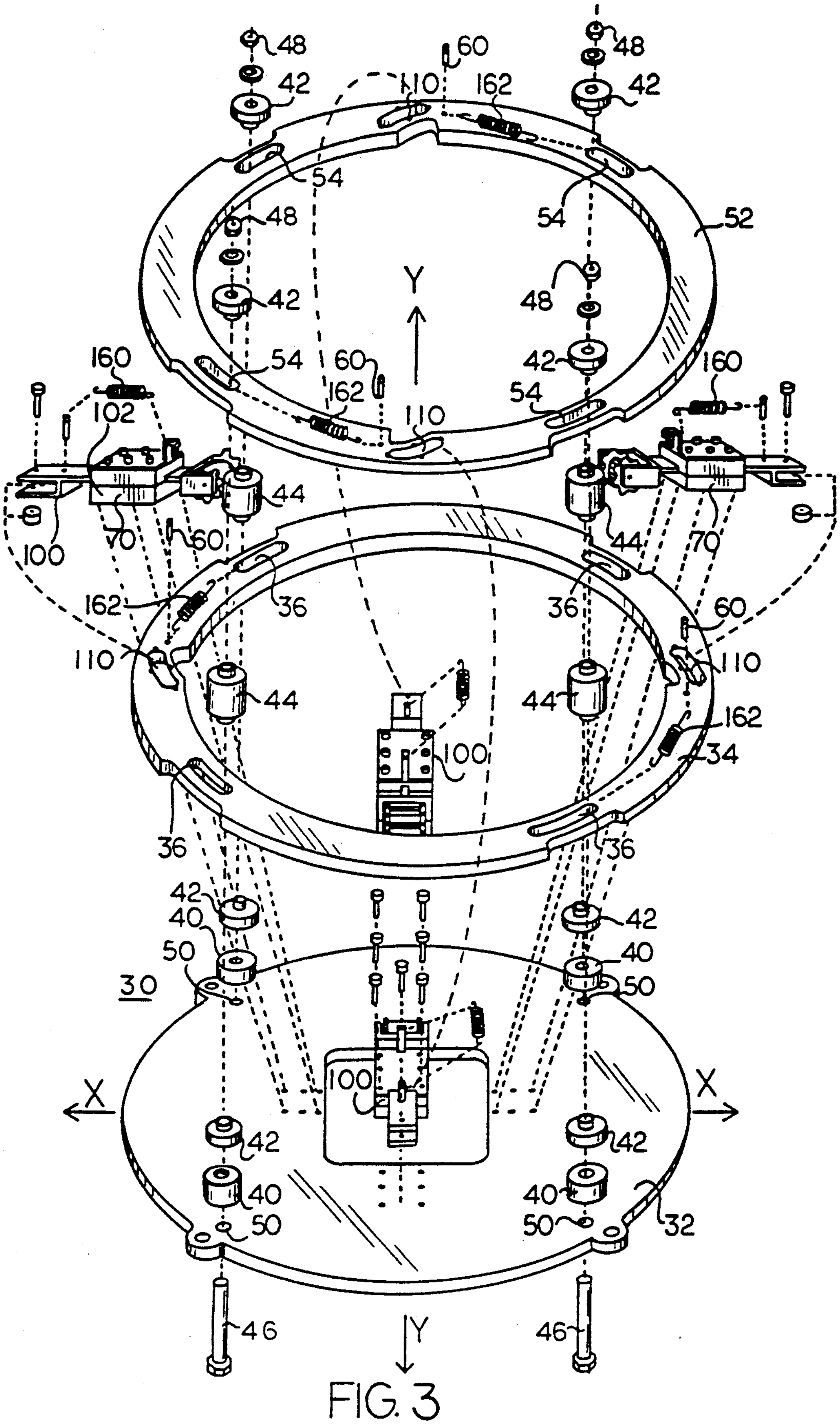
FIG. 3 is an exploded representational perspective view of a tensioner assembly.

Like most fruits and vegetables, potatoes are not of uniform size and shape. For purposes of this description it will be most useful to orient everything with a consistent, x, y, and z set of axes, with the z axis being the vertical axis in relation to the drawings, and the x and y being planar and horizontal, as is shown in FIGS. 1, 2 and 3. Similarly, given the general potato shape as being oblong, for purposes of this specification, that shall be identified as the z axis, or longitudinal axis, with the x and y being perpendicular thereto and describing a planar axis set normal to the z axis and would represent a cross-sectional axis relative to the potato. This is of significance in this specification since potatoes, while generally oblong, are not necessarily cross-sectionally round.

It has been found in practice that potatoes deposited into drop point 20 will orient themselves so as to pass with their z, or longitudinal axes, in alignment, into conveyor channel 22 formed by the four conveyor chains 24 and be pulled down channel 22 into cutting assembly 200. It has also been found in practice that in order to pull the potatoes down the channel with sufficient force to drive them into rotating cutter assembly 200, it is necessary that lugged chains be used, and that they be maintained in such a manner that they are tensioned against each side of the potato with a tensional force of between 10 foot pounds to 80 foot pounds, with the actual tensional force used being dependent upon a number of variable factors including the condition of the potatoes, moisture content, whether or not they have been peeled, and the actual surface conditions of the potatoes. For other food products, the tensional force may be higher or lower. It has also been found in practice that it is necessary to hold each individual potato, from all four sides, with an equal amount of force. Holding each individual potato on just two sides as opposed to four, will not generate sufficient holding force to drive the potatoes through the cutter assembly.

In order to accomplish this my conveyor chain assembly is provided with a plurality of tensioner assemblies 30 which are configured to hold opposing chains 24 in position to form food transport channel 22 which is slightly smaller than the smallest potato to be conveyed to the cutter assembly.

As potatoes pass down through food channel 22 and past each tensioner assembly 30 the opposing conveyor chains 24 bulge out and around the potato under tension controlled by tensioner assemblies 30. The situation is analogous to a lump of food being swallowed and passed down through the human esophagus as is often humorously portrayed in cartoon characters as showing lumps sequentially passing through the throat.

If conveyor chains 24 forming food channel 22 were not resiliently held in position by tensioner assemblies 30, and instead relied solely on internal, longitudinal tensional forces within the chains, the variations in cross-sectional sizes and shapes of the potatoes would result in some potatoes being held much more firmly than others and insufficient holding forces would be generated which would result in the conveyor system being unable to drive the potatoes through the rotating cutter blade assembly 12. The conveyor system would quickly plug.

Figure 7:
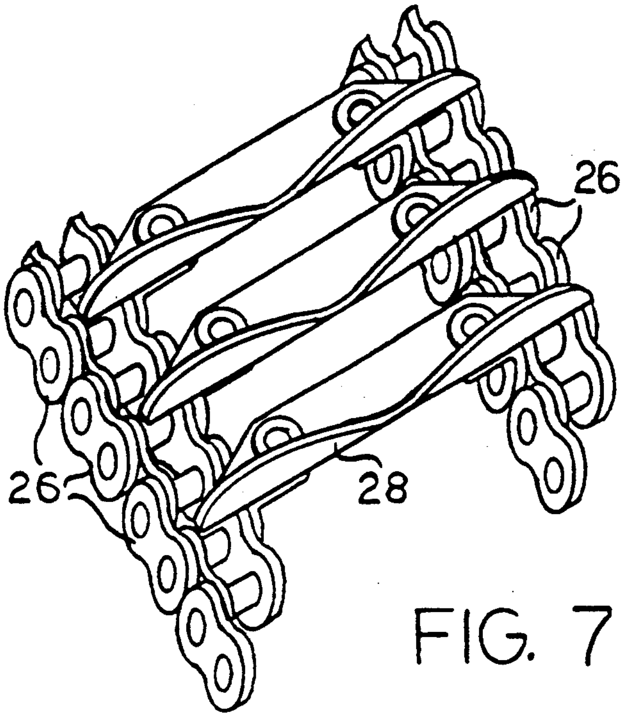
FIG. 7 is a perspective representational view of a length of chain.
Figure 8:
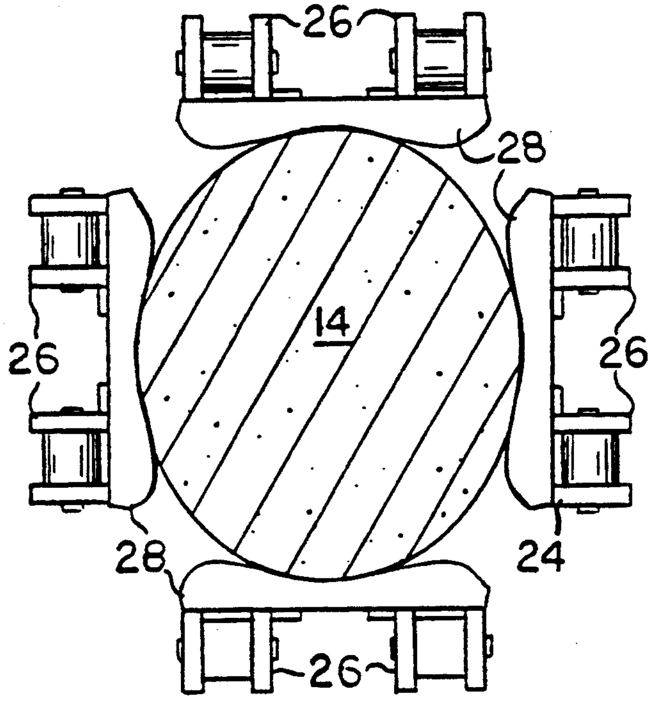
FIG. 8 is a representational sectional top view of conveyor chain gripping a food product.

As shown in FIGS. 1, 7 and 8, chain 24 is a conveyor or belt chain having two sets of drive links 26 interconnected by spanning lugs 28 which are shaped to firmly grip the food product in transport channel 22, which in this case is potato 14.

Figure 4:
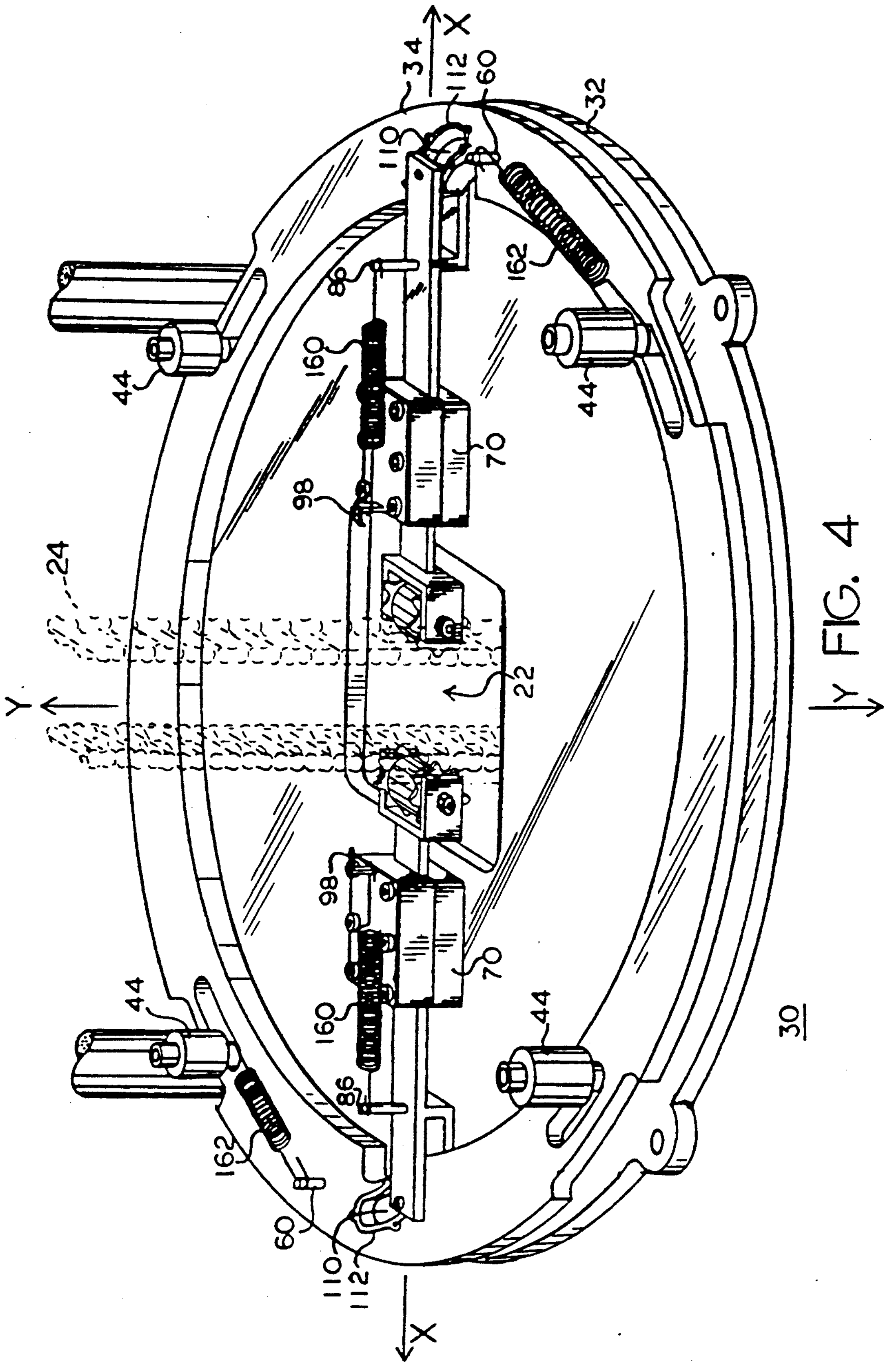
FIG. 4 is a perspective representational view of a tensioner assembly.

The tensioner assembly 30 shown in FIGS. 3 and 4 is designed to maintain a minimum setpoint tension on each potato and to independently release tension in both the x and the y axis as potatoes of varying size and cross-sectional shape pass down through food channel 22 and the central core area of tensioner assemblies 30. As can be seen from FIG. 1, a plurality of tensioner assemblies 30 are provided in a stacked array, however each assembly is identical and functions independent of the others.

Tensioner assembly 30 has as its basic frame member, base plate 32 which is open at its center for passage therethrough of food channel 22 formed of two sets of opposing chains 24. Extending radially inward on the x axis are opposing sprocket assemblies 70 which are interconnected to function with lower cam plate ring 34, and on the y axis opposing sprocket assemblies 100 which are interconnected to and operable with upper cam plate ring 52.

Figure 5:
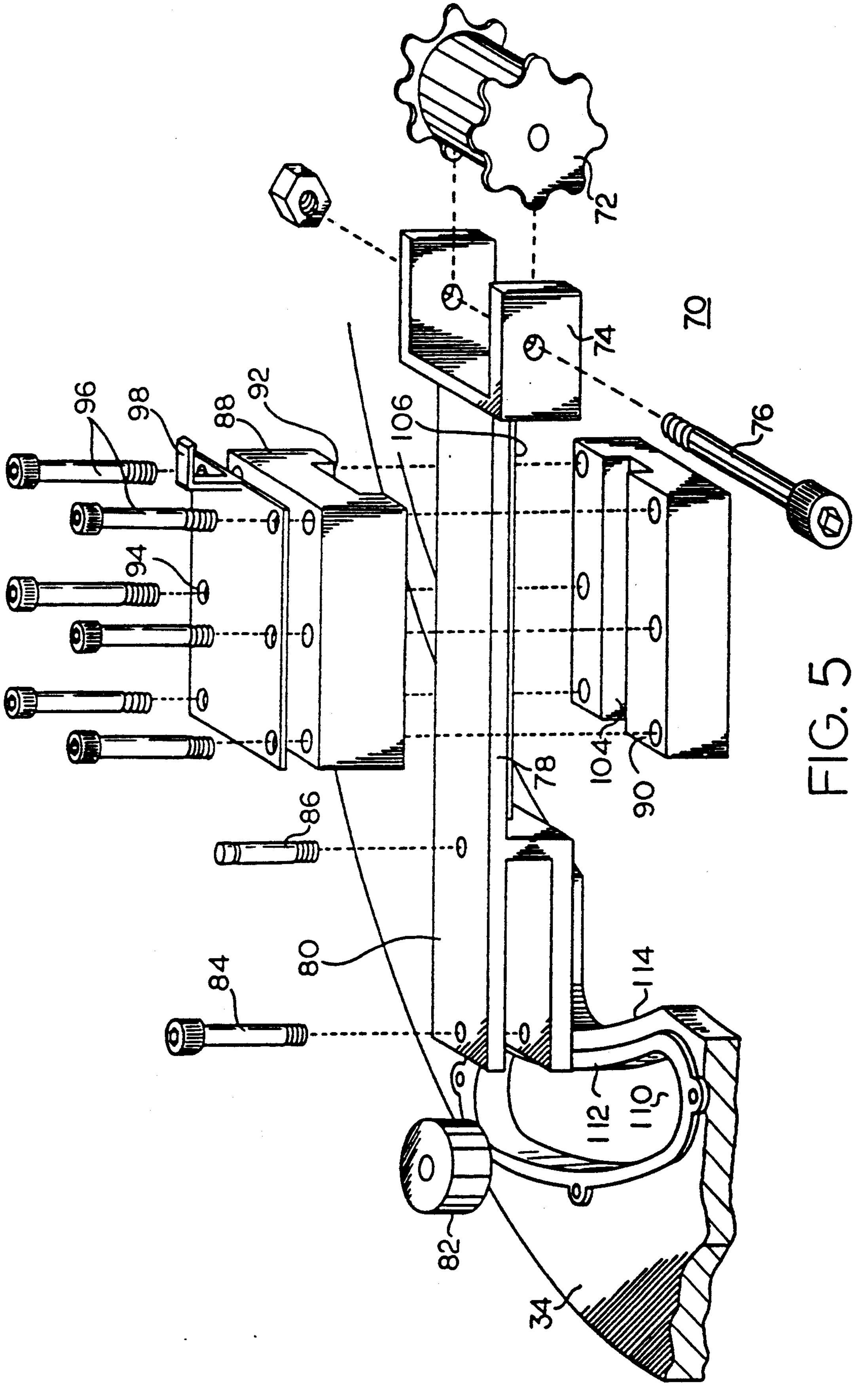
FIG. 5 is an exploded representational view of a sprocket assembly.

As shown in FIGS. 4 and 5, sprocket assembly 70 is designed to release tension on chain 24 as an oversized potato passes down through food channel 22. Sprocket assembly 70 is formed of chain sprocket 72 rotationally held in chain sprocket yoke 74 by means of axle pin 76. Extending back from chain sprocket yoke 74 is sprocket assembly shaft 78 which although generally flat has provided therein elevated rib 106, whose function will be later described. Chain sprocket 72 is sized and configured to hold in alignment conveyor chain 24. At the opposite end of sprocket assembly shaft 78 is provided roller cam yoke 80 which holds a rotatable roller cam 82 by means of roller cam pin 84. Roller cam 82 is held in position within roller cam slideway 110 in lower cam plate ring 34.

Sprocket assembly shaft 78 is slidably held between slide block 88 and slide block cover 90 on slide block bearing surface 92 within slide block 88 with elevated rib 106 interfitting within rib slot 104 of slide block cover 90 to prevent lateral displacement of chain sprocket 72.

Roller cam slideways 110 arcuately spiral out from the inner perimeter of both lower cam plate ring 34 and upper cam plate ring 52. The pair of opposing sprocket assemblies 70 are attached, by means of locking bolts 96 interfitting through slide block cap 94, slide block cover 90 and slide block 88, to base plate 32 along the previously defined x axis. Since roller cams 82 of each of the opposing sprocket assemblies 70 interfit within roller cam slideways 110, it will result in the rotational displacement of lower cam plate ring 34 when chain sprockets 72 are pushed apart by the passage of a potato through the food channel.

In a like manner sprocket assemblies 100 are interconnected with roller cam slideways 110 of upper cam ring 52 to provide for identical reciprocal displacement of sprocket assemblies 100 along the y axis as a potato passes through food channel 22, which is independent of the displacement along the x axis of sprocket assemblies 70.

Both the lower cam ring 34 and upper cam ring 52 are held in parallel rotational alignment with base plate 32 by means of slide pin bolts 46 which extend up through holes 50 in base plate 32 and up through slide pin slots 36 in lower cam ring 34 and slide pin slots 54 in upper cam ring 52. Spacers 40 together with upper and lower bushings 42, and intermediate bushings 44 and nuts 48 are provided to hold lower cam ring 34 and upper cam ring 52 at the appropriate operational level above base plate 32 yet still provide for a limited rotational movement of each of the cam rings.

In practice it has been found that if appropriate spacing is determined, then it is possible to make one sprocket assembly 70 with unequal elevational characteristics between slide block 88 and slide block cover 90 such that it is possible to connect a single design sprocket assembly with either lower cam 34 or upper cam ring 52, merely by flipping the sprocket assembly over. This will simplify manufacturing considerations since all sprocket assemblies are the same, it is just their orientation which is different depending upon whether they are interconnected with lower cam ring 34 or upper cam ring 52.

As previously stated it is of critical importance that each food product piece passing down through food channel 22 be centered over the axis of rotation of cutter assembly 200. This is facilitated by tensioner assemblies 30 and incorporated cam rings 34 and 52 in that the cam rings insure a centering function for tensioner assemblies 30 since displacement of one sprocket assembly on a cam ring will result in an equal and opposite displacement of the second sprocket assembly on the same cam ring, thus urging the potato, regardless of its size and shape, toward the center of food channel 22. The use of a plurality of tensioner assemblies 30, in a stacked array, as is shown in FIG. 1, results in a gradual but definite centering of each potato as it travels down through and is adjusted by tensioner assemblies 30 urged toward the center by the reciprocal opposite displacement of the sprocket assemblies of each tensioner assembly 30.

To maintain uniform tension on the conveyor chains 24 along the entire length of food channel 22, as non-uniformly sized potatoes pass therethrough, two independent sets of tensional adjustment springs are provided. First is the primary tensional spring 160, as shown in FIG. 4 which connects forward spring pin 98 which is fixed along with the slide block assembly to base plate 32, and sprocket spring pin 86 which is attached to the slidable roller cam yoke 80. Primary tensional spring 160 is used to provide a tensional force to hold sprocket assembly 70 such that chain sprockets 72 are fully extended inward so as to hold conveyor chains 24 in their closed channel position, and to insure a uniform minimum tensional force on chain 24 as food product passes down food channel 22 displacing chain sprocket assemblies 70 or 100 along either the x or the y axis as the case may be. Secondary tensional adjustment springs 162, as shown in FIG. 3, are also provided and interconnect between spring posts 60 attached to both lower cam ring 34 and upper cam ring 52 and slide pins 46 so as to provide a tensional force opposing the rotational displacement of lower cam ring 34 and upper cam ring 52 as sprocket assemblies 70 and 100 are displaced outward from the longitudinal centerline of food channel 22. Tensional adjustment is accomplished by changing the springs. Stronger springs will increase tension, and vice versa for decreased tension, depending upon the food product to be cut.

It should be apparent that the primary wear surface in the tensioner mechanism is between roller cam 82 and the sides of roller cam slideways 110. Accordingly, in the preferred embodiment, cam slideway wear sleeves 112 are provided as wear bearing surfaces.

Figure 9:
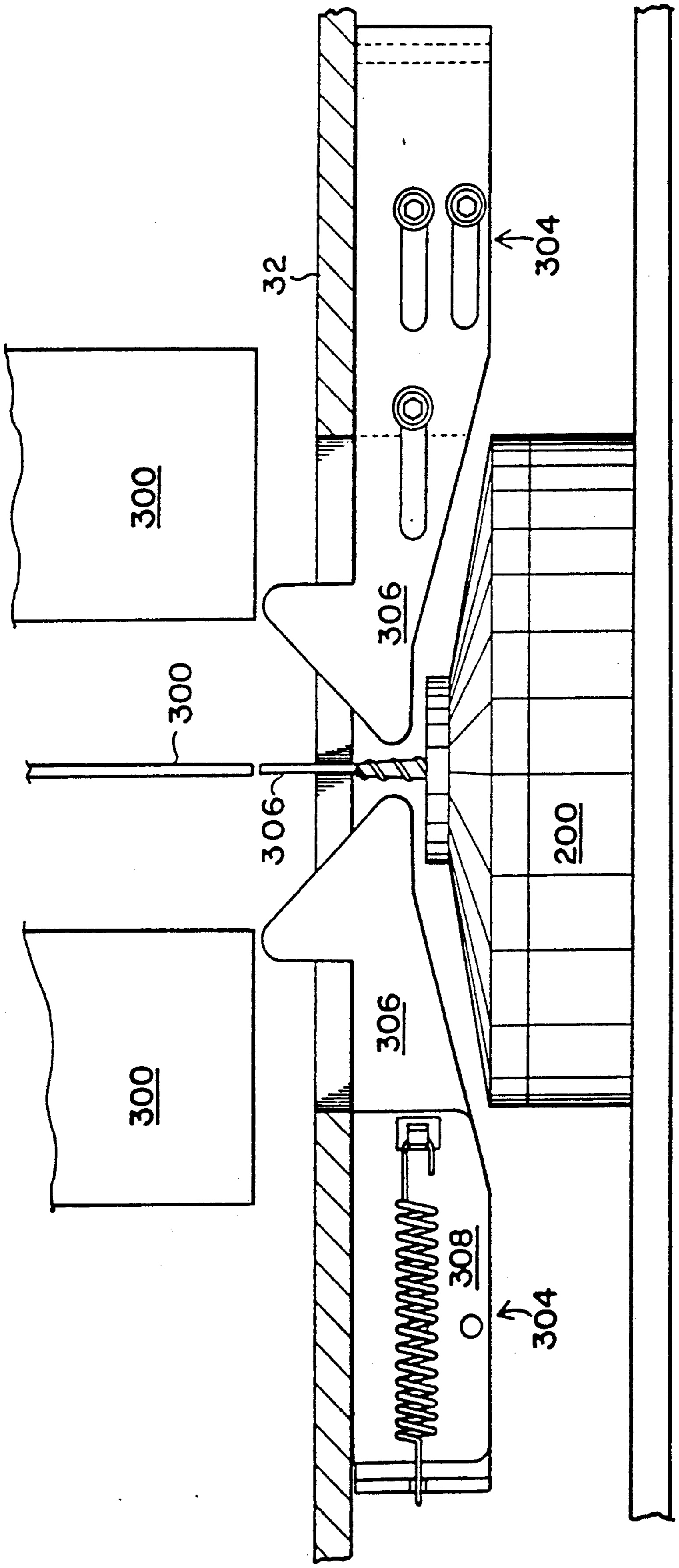
FIG. 9 is a sectional side view showing the slide cam lock assemblies in relation to the head assembly.

Vertical guide rails 300 and 302 are provided as shown in FIGS. 1, 2 and 9 to close the corner gaps between conveyor chains 24. In practice it has been found that this is helpful to insure uniform longitudinal alignment of the potatoes in that occasionally a conveyor chain 24 will grip a potato so tightly that it will pull it out of vertical alignment. Located directly underneath vertical guide rails 300 are slide cam lock assemblies 304 which are formed of spring loaded slide cams 306 held within slide cam housings 308. Spring loaded slide cams 306 are angularly shaped so as to be pushed into slide cam housings 308 and thereby out of the way by potatoes as pass from the food channel 22 into cutter assembly 200, and to spring back into channel 22 behind the end piece of each potato as it is passes through cutter assembly 200. This prevents the end portion of each potato, as it is being cut from popping up out of engagement with cutter assembly 200.

In practice, for potatoes, it has been found that depending upon the condition of the potatoes and the slipperiness of the surfaces of the potatoes which, in itself is dependent upon plant variety and peeling techniques, it is necessary to maintain a tensional force of between 10 foot pounds to 80 foot pounds on conveyor chains 24. For other food products, it may be higher or lower. The initial tension or chain loading, as shown in FIG. 1, is accomplished by use of tensioner sprocket 142 which is rotatably attached to spring loaded tensioner assembly 140. Chain 24, on its return loop back to the top of the assembly, passes over tensioner sprocket 142 and then up and over return sprockets 144 and 146 back to the top of food transport channel 22.

Figure 6:
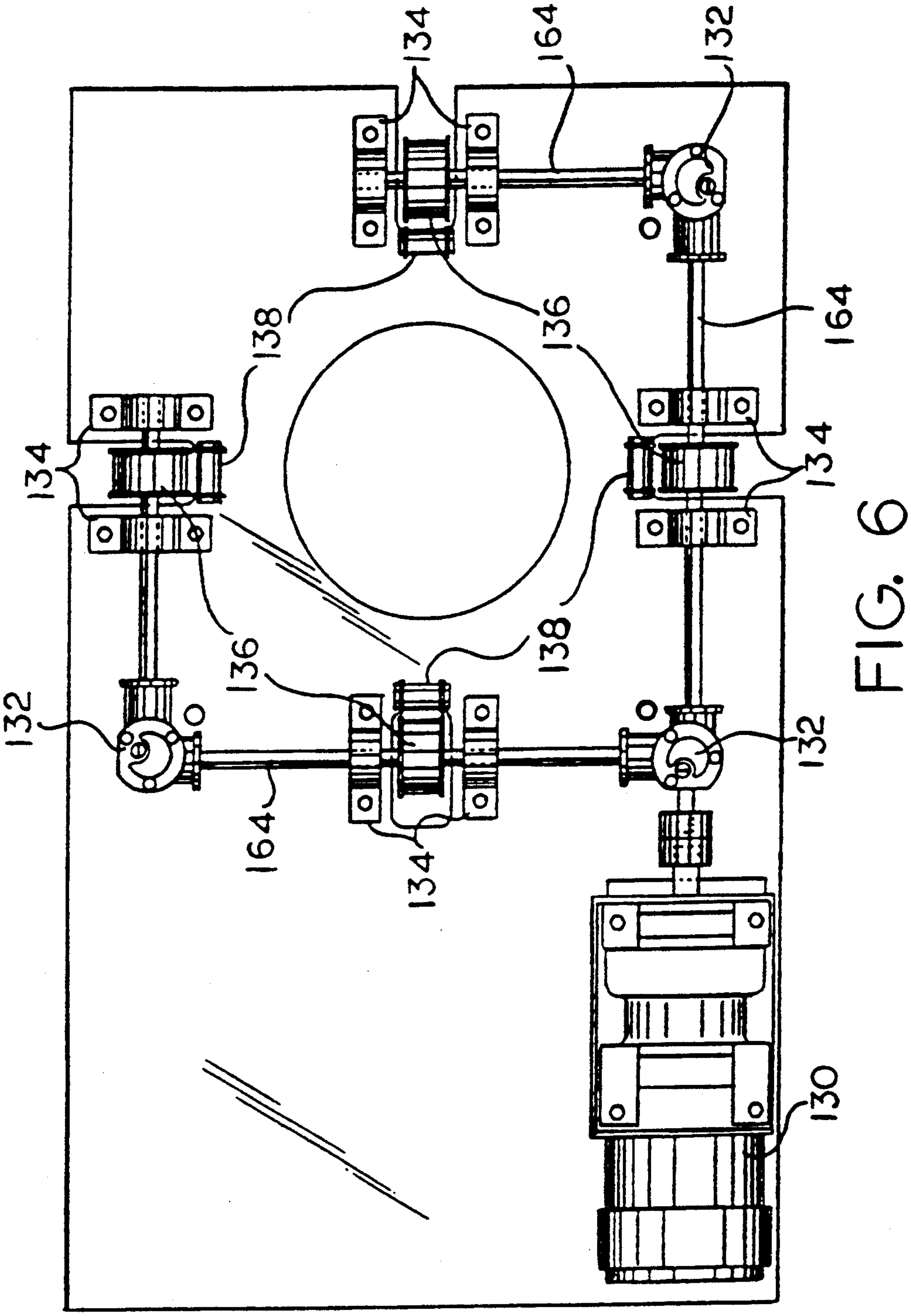
FIG. 6 is a top plan view of the chain drive assembly.

As shown in FIGS. 1, 2 and 6, at the lower end of the outside loop for each of the four chains 24 is found a drive gear 136 and idler sprocket 138. Chains 24 after passing around the lowermost chain sprocket 72 travels down and around idler sprocket 138 and drive gear 136.

In order for this conveyor system to work it is imperative that all four chains 24 be driven at identical, synchronized speeds. This is accomplished by use of an interlocked shaft system having four chain drive shafts 164, each interconnected, one to the other, by means of three right-angle bevel gear assemblies 132. Drive shafts 164 are held firmly in place by means of bearing assemblies 134 which are positioned adjacent to each side of each of drive pulleys 136. Power is provided by a conventional electric motor 130 which is interconnected to one of the right-angle bevel gear assemblies to drive the entire assembly at a synchronized speed. In practice it is necessary to closely control the speed at which the conveyor chain assembly is driven and that this is easily accomplished by use of a variable speed frequency converter to adjust the frequency of alternating current being supplied to electric motor 130.

In practice it has been found that potatoes enter the food channel 22, one after the other, with chains 24 being held in uniform tension around each potato, regardless of potato size and shape, by means of tensioner assemblies 30. In practice it has been found that if one potato starts to slip as it is being cut by rotating cutter assembly 200, the potatoes following will continue to move down through channel 22, and eventually butt up against the slipping potato and literally give it an additional push to keep it moving through the conveyor.

While there is shown and described the present preferred embodiment of the invention, it is to be distinctly understood that this invention is not limited thereto but may be variously embodied to practice within the scope of the following claims.

I claim:

1. A conveyor chain transport system for conveying food products in sequential and aligned arrangement which comprises:

a first pair of endless conveyor chain loops each having one segment of conveyor chain loop in juxtaposed, parallel spaced relationship to a corresponding segment of the other loop, said juxtaposed loop segments being of substantially the same length and defining between them a longitudinal space of predetermined length and a three coordinate planar reference system with an x axis being aligned normal to and passing through the centerline of the surfaces of each of said first pair of opposing conveyor chain loop segments, and a y axis perpendicular to the x axis and oriented to define, together with the x axis, a plane normal to the surfaces of said loop segments, and a z axis normal to and coincident with the center point of the plane and coincident to the longitudinal centerline of the longitudinal space between said first pair of conveyor loop segments;

a second pair of endless conveyor chain loops each having one segment of conveyor chain loop in juxtaposed, parallel spaced relationship to a corresponding segment of the other loop, said juxtaposed loop segments each being of substantially the same length as the first pair of loop segments, and normal to the y axis, the plane defined by the x and y axis and the first pair of juxtaposed loop segments so as to define a longitudinal passageway with a longitudinal axis coincident with the z axis for the passage of food products therethrough from a receiving end to a discharge end;

means for laterally tensioning the first pair of chain loop segments oriented normal to the x axis against outward displacement along the x axis;

means for laterally tensioning the second pair of chain loop segments oriented normal to the y axis against outward displacement along the y axis; and means for turning each conveyor chain loop simultaneously at the same speed operatively connected to said first and second pairs of chain loops.

2. The conveyor chain transport system of claim No. 1 wherein the means for laterally tensioning both the first and second pairs of chain loop segments are operable each independent of the other.

3. The conveyor chain transport system of claim No. 1 which further comprises means for equally and laterally tensioning both chain loop segments of the first pair of chain loop segments one to the other, and means for equally and laterally tensioning both chain loop segments of the second pair of chain loop segments one to the other.

4. The conveyor chain transport system of claim No. 1 wherein the cross-sectional area of the longitudinal passageway is configured to be smaller than the cross-sectional area of the food products to be conveyed there through.

5. The conveyor chain transport system of claim No. 1 wherein each of the loops of conveyor chain further comprises:

a pair of endless loops of drive chain links held in a juxtaposed parallel spaced relationship;

a plurality of chain lugs spanning between and attached to corresponding pairs of drive chain links for holding said endless loops of drive chain links in juxtaposed parallel spaced relationship.

6. The conveyor chain transport system of claim No. 5 which further comprises means for equally and laterally tensioning both chain loop segments of the first pair of chain loop segments one to the other, and means for equally and laterally tensioning both chain loop segments of the second pair of chain loop segments one to the other.

7. A conveyor chain transport system for conveying food products in sequential and aligned arrangement which comprises:

a first pair of endless conveyor chain loops each having one segment of conveyor chain loop in juxtaposed, parallel spaced relationship to a corresponding segment of the other loop, said juxtaposed loop segments being of substantially the same length and defining between them a longitudinal space of predetermined length and a three coordinate planar reference system with an x axis being aligned normal to and passing through the centerline of the surfaces of each of said first pair of opposing conveyor chain loop segments, and a y axis perpendicular to the x axis and oriented to define, together with the x axis, a plane normal to the surfaces of said loop segments, and a z axis normal to and coincident with the center point of the plane and coincident to the longitudinal centerline of the longitudinal space between said first pair of conveyor loop segments;

a second pair of endless conveyor chain loops each having one segment of conveyor chain loop in juxtaposed, parallel spaced relationship to a corresponding segment of the other loop, said juxtaposed loop segments each being of substantially the same length as the first pair of loop segments, and normal to the y axis, the plane defined by the x and y axis and the first pair of juxtaposed loop segments so as to define a longitudinal passageway with a longitudinal axis coincident with the z axis for the passage of food products therethrough from a receiving end to a discharge end;

a base plate having a central opening for the passage of said first and second conveyor chain loop segments, which define the longitudinal passageway, therethrough;

a first cam ring rotatably attached to the base plate, said first cam ring further having a pair of opposing arcuate and spirally positioned cam slideways each for receiving, in interfitting relationship, a cam roller;

a first pair of chain sprocket assemblies each having a chain sprocket for rotatable engagement with a chain loop segment at its inward end, and a cam sprocket at its outward end for interfitting rotational engagement within a cam slideway of the first cam ring, slidably attached to the base plate and oriented for displacement of the cam sprocket outward along the x axis;

means for tensionally biasing said first pair of chain sprocket assemblies against outward displacement along the x axis;

a second cam ring rotatably attached to the base plate, said second cam ring further having a pair of opposing arcuate and spirally positioned cam slideways each for receiving, in interfitting relationship, a cam roller;

a second pair of chain sprocket assemblies each having a chain sprocket for rotatable engagement with a chain loop segment at its inward end, and a cam sprocket at its outward end for interfitting rotational engagement within a cam slideway of the second cam ring, slidably attached to the base plate and oriented for displacement of the cam sprocket outward along the y axis; and means for tensionally biasing said second pair of chain sprocket assemblies against outward displacement along the y axis;

means for turning each conveyor chain loop simultaneously at the same speed operatively connected to said first and second pairs of chain loops.

8. The conveyor chain transport system of claim No. 7 which further comprises means for biasing a cam ring against rotation when the chain sprocket assemblies are displaced outward along an axis.

9. The conveyor chain transport system of claim 7 wherein the chain sprocket assemblies each further comprise:

a sprocket assembly shaft having attached at one end a chain sprocket yoke, and at the other end a cam roller yoke, slidably held within a slide block;

a chain sprocket rotatably attached to the chain sprocket yoke;

each of the cam rollers being configured for interfitting within one of the cam slideways rotatably attached to the cam roller yoke; and a slide block for slidably holding the sprocket assembly shaft attached to the base plate.

10. The conveyor chain transport system of claim No. 7 wherein the cross-sectional area of the longitudinal passageway is configured to be smaller than the cross-sectional area of the food products to be conveyed therethrough.

11. The conveyor chain transport system of claim No. 1 wherein each of the loops of conveyor chain further comprises:

a pair of endless loops of drive chain links held in a juxtaposed parallel spaced relationship;

a plurality of chain lugs spanning between and attached to corresponding pairs of drive chain links for holding said endless loops of drive chain links in juxtaposed parallel spaced relationship.

12. A single axis tensioning means for a conveyor chain transport system having at least a pair of parallel chain loop segments, which comprises:

a base plate having a central opening for the passage of a pair of conveyor chain loop segments therethrough;

a cam ring rotatably attached to the base plate, said cam ring further having a pair of opposing arcuate and spirally positioned cam slideways each for receiving, in interfitting relationship, a cam roller;

a pair of chain sprocket assemblies each having a chain sprocket for rotatable engagement with a chain loop segment at its inward end, and a cam roller at its outward end for interfitting rotational engagement within a cam slideway of the cam ring, slidably attached to the base plate and oriented for displacement of the cam sprocket outward along an axis;

means for tensionally biasing said pair of chain sprocket assemblies against outward displacement along the axis.

13. The tensioning apparatus of claim 12 wherein the chain sprocket assemblies each further comprise:

a sprocket assembly shaft having attached at one end a chain sprocket yoke, and at the other end a cam roller yoke, slidably held within a slide block;

a chain sprocket rotatably attached to the chain sprocket yoke;

each of the cam rollers being configured for interfitting within one of the cam slideways rotatably attached to the cam roller yoke; and a slide block for slidably holding the sprocket assembly shaft attached to the base plate.

14. A multiple axis tensioning means for a conveyor chain transport system having a plurality of pairs of parallel chain loop segments with each pair of parallel chain loop segments aligned along a separate axis, which comprises:

a base plate having a central opening for the passage of a plurality of pairs of conveyor chain loop segments therethrough;

a plurality of cam rings rotatably attached to the base plate, with each of said cam rings further having a pair of opposing arcuate and spirally positioned cam slideways each for receiving, in interfitting relationship, a cam roller;

a plurality of paired of chain sprocket assemblies each having a chain sprocket for rotatable engagement with a chain loop segment at its inward end, and a cam roller at its outward end for interfitting rotational engagement within a cam slideway of the cam ring, slidably attached to the base plate and oriented for displacement of the cam sprocket outward along an axis of a pair of conveyor chain loop segments;

means for tensionally biasing each of said pairs of chain sprocket assemblies against outward displacement along its axis.

15. The tensioning apparatus of claim No. 14 wherein the chain sprocket assemblies each further comprise:

a sprocket assembly shaft having attached at one end a chain sprocket yoke, and at the other end a cam roller yoke, slidably held within a slide block;

a chain sprocket rotatably attached to the chain sprocket yoke;

a cam roller configured for interfitting within a cam slideway rotatably attached to the cam roller yoke; and a slide block for slidably holding the sprocket assembly shaft attached to the base plate.

* * * * *